(12) United States Patent
Channabasavaiah et al.

(10) Patent No.: US 9,268,532 B2
(45) Date of Patent: Feb. 23, 2016

(54) CONSTRUCTING A SERVICE ORIENTED ARCHITECTURE SHARED SERVICE

(75) Inventors: Kishore Channabasavaiah, Palatine, IL (US); Stephen C. Kendrick, Fairfax, VA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/392,189

(22) Filed: Feb. 25, 2009

(65) Prior Publication Data

US 2010/0218162 A1    Aug. 26, 2010

(51) Int. Cl.
*G06F 9/44* (2006.01)
*G06F 9/445* (2006.01)
*G06F 11/36* (2006.01)

(52) U.S. Cl.
CPC .. *G06F 8/10* (2013.01); *G06F 8/20* (2013.01); *G06F 8/30* (2013.01); *G06F 8/60* (2013.01); *G06F 8/70* (2013.01); *G06F 11/36* (2013.01)

(58) Field of Classification Search
CPC ............. G06Q 10/06; G06F 8/20; G06F 8/36; G06F 8/10; G06F 8/71; G06F 8/70; G06F 8/00
USPC ........................................................ 717/103
See application file for complete search history.

(56) References Cited

U.S. PATENT DOCUMENTS

| | | |
|---|---|---|
| 6,266,243 B1 | 7/2001 | Tomioka |
| 6,850,893 B2 | 2/2005 | Lipkin et al. |
| 6,925,642 B1 | 8/2005 | Commander |
| 7,197,466 B1 | 3/2007 | Peterson et al. |
| 7,487,534 B1 | 2/2009 | Peterka et al. |
| 7,584,282 B2 | 9/2009 | Reeves et al. |
| 7,797,400 B2 * | 9/2010 | Singh et al. ................... 709/219 |
| 7,979,379 B2 | 7/2011 | Voegele et al. |
| 8,036,909 B2 | 10/2011 | Whitworth et al. |
| 8,200,527 B1 | 6/2012 | Thompson et al. |
| 8,244,847 B2 | 8/2012 | Channabasavaiah et al. |
| 8,266,243 B1 | 9/2012 | Carlson et al. |
| 8,392,540 B2 | 3/2013 | Channabasavaiah et al. |

(Continued)

FOREIGN PATENT DOCUMENTS

| | | |
|---|---|---|
| CA | 2544669 | 12/2006 |
| JP | 2006099162 A | 4/2006 |
| WO | 2008011122 A2 | 1/2008 |

OTHER PUBLICATIONS

A. Arsanjani, S. Ghosh, A. Allam, T. Abdollah, S. Ganapathy, and K. Holley. "SOMA: A Method for Developing Service-Oriented Solutions". IBM Systems J. vol. 47, No. 3. pp. 377-396. 2008.*

(Continued)

*Primary Examiner* — Jason Mitchell
*Assistant Examiner* — Mark Gooray
(74) *Attorney, Agent, or Firm* — Maeve L. McCarthy; Madeline F. Schiesser; Keohane & D'Alessandro PLLC

(57) ABSTRACT

An approach that constructs a service oriented architecture (SOA) shared service is provided. In one embodiment, there is a service construction tool, including an input component configured to receive design input for a SOA shared service solution; and a construction component configured to construct a SOA shared service based on the design input for the SOA shared service solution.

20 Claims, 5 Drawing Sheets

(56) References Cited

U.S. PATENT DOCUMENTS

| | | | |
|---|---|---|---|
| 8,413,107 B2* | 4/2013 | Brininstool et al. | 717/104 |
| 8,745,783 B2 | 6/2014 | Jansen | |
| 8,843,877 B2* | 9/2014 | Dutta et al. | 717/101 |
| 2002/0049571 A1 | 4/2002 | Verma et al. | |
| 2002/0133325 A1 | 9/2002 | Hoare et al. | |
| 2002/0184610 A1 | 12/2002 | Chong et al. | |
| 2003/0084127 A1* | 5/2003 | Budhiraja et al. | 709/220 |
| 2003/0105887 A1 | 6/2003 | Cox et al. | |
| 2003/0200130 A1 | 10/2003 | Kall et al. | |
| 2004/0019500 A1 | 1/2004 | Ruth | |
| 2004/0093381 A1 | 5/2004 | Hodges et al. | |
| 2005/0044197 A1 | 2/2005 | Lai | |
| 2005/0188345 A1 | 8/2005 | Chang et al. | |
| 2005/0222931 A1 | 10/2005 | Mamou et al. | |
| 2005/0223109 A1* | 10/2005 | Mamou et al. | 709/232 |
| 2005/0246215 A1 | 11/2005 | Rackham | |
| 2005/0256882 A1* | 11/2005 | Able et al. | 707/10 |
| 2005/0259683 A1 | 11/2005 | Bishop et al. | |
| 2005/0261914 A1 | 11/2005 | Brookins | |
| 2005/0283667 A1* | 12/2005 | Batten et al. | 714/25 |
| 2005/0289536 A1* | 12/2005 | Nayak et al. | 717/174 |
| 2006/0026049 A1 | 2/2006 | Joseph et al. | |
| 2006/0036941 A1* | 2/2006 | Neil | 715/526 |
| 2006/0047665 A1* | 3/2006 | Neil | 707/10 |
| 2006/0059253 A1* | 3/2006 | Goodman et al. | 709/223 |
| 2006/0069605 A1 | 3/2006 | Hatoun | |
| 2006/0069995 A1* | 3/2006 | Thompson et al. | 715/700 |
| 2006/0074618 A1* | 4/2006 | Miller et al. | 703/13 |
| 2006/0111921 A1* | 5/2006 | Chang et al. | 705/1 |
| 2006/0116922 A1 | 6/2006 | Homann et al. | |
| 2006/0129992 A1* | 6/2006 | Oberholtzer et al. | 717/124 |
| 2006/0206856 A1 | 9/2006 | Breeden et al. | |
| 2006/0222361 A1 | 10/2006 | Aoki | |
| 2006/0235733 A1* | 10/2006 | Marks | 705/7 |
| 2007/0016457 A1 | 1/2007 | Schreiber et al. | |
| 2007/0022404 A1 | 1/2007 | Zhang et al. | |
| 2007/0033129 A1 | 2/2007 | Coates | |
| 2007/0033273 A1 | 2/2007 | White et al. | |
| 2007/0043724 A1 | 2/2007 | Senan et al. | |
| 2007/0150480 A1* | 6/2007 | Hwang et al. | 707/10 |
| 2007/0179826 A1 | 8/2007 | Cutlip et al. | |
| 2007/0220370 A1 | 9/2007 | Branda et al. | |
| 2007/0234293 A1* | 10/2007 | Noller et al. | 717/124 |
| 2007/0240102 A1* | 10/2007 | Bello et al. | 717/104 |
| 2007/0288275 A1 | 12/2007 | Kumar | |
| 2008/0021753 A1 | 1/2008 | Cummins | |
| 2008/0027784 A1 | 1/2008 | Ang et al. | |
| 2008/0028365 A1 | 1/2008 | Erl | |
| 2008/0066048 A1 | 3/2008 | Hafermann et al. | |
| 2008/0077652 A1 | 3/2008 | Grant et al. | |
| 2008/0126390 A1* | 5/2008 | Day et al. | 707/102 |
| 2008/0126406 A1* | 5/2008 | Endabetla et al. | 707/103 R |
| 2008/0140857 A1 | 6/2008 | Conner et al. | |
| 2008/0177564 A1 | 7/2008 | An et al. | |
| 2008/0228665 A1 | 9/2008 | Gotthelf et al. | |
| 2008/0250386 A1 | 10/2008 | Erl | |
| 2008/0282219 A1* | 11/2008 | Seetharaman et al. | 717/101 |
| 2008/0288944 A1 | 11/2008 | Coqueret et al. | |
| 2009/0019420 A1 | 1/2009 | Johnson | |
| 2009/0055888 A1* | 2/2009 | Little | 726/1 |
| 2009/0089078 A1 | 4/2009 | Bursey | |
| 2009/0112646 A1* | 4/2009 | Bruce et al. | 705/7 |
| 2009/0125796 A1 | 5/2009 | Day et al. | |
| 2009/0132708 A1 | 5/2009 | Hayward | |
| 2009/0204660 A1* | 8/2009 | Chappell | 709/201 |
| 2009/0210499 A1 | 8/2009 | Upadhyayula et al. | |
| 2010/0057835 A1* | 3/2010 | Little | 709/203 |
| 2010/0131326 A1 | 5/2010 | Channabasavaiah et al. | |
| 2010/0211925 A1 | 8/2010 | Channabasavaiah et al. | |
| 2010/0217632 A1 | 8/2010 | Channabasavaiah et al. | |
| 2010/0217633 A1 | 8/2010 | Channabasavaiah et al. | |
| 2010/0217636 A1 | 8/2010 | Channabasavaiah et al. | |
| 2010/0218163 A1 | 8/2010 | Channabasavaiah et al. | |
| 2010/0257010 A1 | 10/2010 | Allam et al. | |
| 2012/0168997 A1 | 7/2012 | Jansen | |

OTHER PUBLICATIONS

U.S. Appl. No. 12/277,280, Office Action, May 5, 2011, 13 pages.
U.S. Appl. No. 12/277,280, Office Action, Jun. 14, 2011, 12 pages.
U.S. Appl. No. 12/277,280, Office Action, Jan. 16, 2014, 36 pages.
U.S. Appl. No. 12/277,280, Office Action, Sep. 13, 2011, 18 pages.
U.S. Appl. No. 12/388,533, Office Action, Jul. 11, 2011, 19 pages.
U.S. Appl. No. 12/388,533, Office Action, Mar. 17, 2014, 30 pages.
U.S. Appl. No. 12/388,533, Final Office Action, Aug. 12, 2011, 16 pages.
U.S. Appl. No. 12/388,533, Final Office Action, Oct. 24, 2013, 19 pages.
U.S. Appl. No. 12/391,426, Office Action, Oct. 27, 2011, 11 pages.
U.S. Appl. No. 12/391,426, Final Office Action, Apr. 27, 2012, 11 pages.
U.S. Appl. No. 12/391,426, Corrected Notice of Allowance, Nov. 8, 2012, 16 pages.
U.S. Appl. No. 12/391,728, Office Action, Mar. 1, 2012, 15 pages.
U.S. Appl. No. 12/391,728, Final Office Action, Jul. 16, 2012, 14 pages.
U.S. Appl. No. 12/391,728, Notice of Allowance, Oct. 15, 2012, 6 pages.
U.S. Appl. No. 12/391,362, Office Action, Jun. 16, 2011, 51 pages.
Gewald et al., "A Governance Model for Managing Outsourcing Partnerships", Proceedings of the 39th Hawaii International Conference on Systems Sciences, 2006.
Papazoglou et al., "Service oriented architectures: approaches, technologies and research issues", The VLDB Journal (2007) 16, pp. 389-415, 2007.
U.S. Appl. No. 12/392,567, Office Action, May 9, 2012, 13 pages.
U.S. Appl. No. 12/392,567, Office Action, Feb. 6, 2013, 19 pages.
U.S. Appl. No. 12/392,567, Office Action, Dec. 4, 2013, 38 pages.
U.S. Appl. No. 12/392,567, Final Office Action, Aug. 23, 2012, 9 pages.
U.S. Appl. No. 12/392,567, Final Office Action, Jun. 21, 2013, 25 pages.
U.S. Appl. No. 12/392,567, Notice of Allowance, Jun. 30, 2014, 16 pages.
U.S. Appl. No. 12/393,110, Office Action, Nov. 8, 2011, 10 pages.
U.S. Appl. No. 12/393,110, Notice of Alowance, Apr. 3, 2012, 9 pages.
U.S. Appl. No. 12/391,362, Office Action, Sep. 12, 2011, 16 pages.
U.S. Appl. No. 12/391,362, Office Action, Apr. 16, 2014.
Gu et al., "A stakeholder-driven Service Life Cycle Model for SOA", IW-SOSWE '07, Sep. 3, 2007, 7 pages.
U.S. Appl. No. 12/388,533, Office Action, Oct. 9, 2014, 33 pages.
U.S. Appl. No. 12/277,280, Office Action Jul. 25, 2014, 44 pages.
U.S. Appl. No. 12/392,567, Notice of Allowance, Aug. 25, 2014, 21 pages.
Thomas L. Mansfield, USPTO Office Action, U.S. Appl. No. 12/391,362, Notification Date Oct. 22, 2014, 27 pages.
U.S. Appl. No. 12/391,362, Office Action, IBME-1014, Apr. 30, 2015, 21 pages.
Shanker, U.S. Appl. No. 12/388,533, Office Action dated Jul. 27, 2015, 30 pages.
Bea, "Right from the Start: SOA Life Cycle Governance", 1995, 15 pages.
IBM, "Advancing SOA Governance and Service Lifecycle Management", Mar. 18, 2009, 4 pages.
Cai, "A Two Steps Method for Analyzing Dependency Of Business Services On IT Services Within A Service Life Cycle" IEEE International Conference on Web Services, 2006, 6 pages.
Simon et al., "Service Contract Template", IEEE International Conference on Services Computing, 2006, 1 page.
IBM, "IBM Problem Determination Tools help develop, test, and deploy your service-oriented architecture applications", IBM United States Announcement, 207-206, dated Sep. 18, 2007, 24 pages.
Akida, U.S. Appl. No. 12/419,431, Office Action dated Aug. 3, 2011, 73 pages.
Akida, U.S. Appl. No. 12/419,431, Final Office Action dated Nov. 9, 2011, 18 pages.
Akida, U.S. Appl. No. 12/419,431, Office Action dated Mar. 2, 2012, 17 pages.

(56) References Cited

OTHER PUBLICATIONS

Akida, U.S. Appl. No. 12/419,431, Final Office Action dated Jan. 10, 2013, 18 pages.
Akida, U.S. Appl. No. 12/419,431, Office Action dated Apr. 10, 2014, 27 pages.
Akida, U.S. Appl. No. 12/419,431, Office Action dated 1012812014, 17 pages.
Akida, U.S. Appl. No. 12/419,431, Final Office Action dated May 20, 2015, 9 pages.
U.S. Appl. No. 12/277,280, Office Action dated Sep. 9, 2015, 47 pages.

* cited by examiner

CONSTRUCTING A SERVICE ORIENTED ARCHITECTURE SHARED SERVICE

CROSS-REFERENCE TO RELATED APPLICATION

The present application is related in some aspects to commonly owned and co-pending application entitled "Identification of a Service Oriented Architecture Shared Services Project", which was filed on Nov. 24, 2008, and was assigned application Ser. No. 12/277,280, commonly owned and co-pending application entitled "Evaluating a Service Oriented Architecture Shared Services Project", which was filed on Feb. 19, 2009, and was assigned application Ser. No. 12/388,533, commonly owned and co-pending application entitled "Selecting a Service Oriented Architecture Shared Service", and was assigned application Ser. No. 12/391,426, commonly owned and co-pending application entitled "Designing a Service Specific Service Oriented Architecture Shared Service Solution", which was filed on Feb. 24, 2009, and was assigned application Ser. No. 12/391,728, commonly owned and co-pending application entitled "Transitioning to Management of a Service Oriented Architecture Shared Service", which was filed on Feb. 25, 2009, and was assigned application Ser. No. 12/392,567, commonly owned and co-pending application entitled "Management of a Service Oriented Architecture Shared Service", which was filed on Feb. 26, 2009, and was assigned application Ser. No. 12/393,110, commonly owned and co-pending application entitled "Managing a Service Oriented Architecture (SOA) Shared Services Escalation", which was filed on Feb. 24, 2009, and was assigned application Ser. No. 12/391,362, the entire contents of which are herein incorporated by reference.

FIELD OF THE INVENTION

This invention relates generally to lifecycle management and more specifically to the construction of SOA shared services.

BACKGROUND OF THE INVENTION

In the past, software architectures have attempted to deal with increasing levels of software complexity. As the level of complexity continues to increase, traditional architectures are reaching the limit of their ability to deal with various problems. At the same time, traditional needs of information technology (IT) organizations persist. IT organizations need to respond quickly to new requirements of the business, while continuing to reduce the cost of IT to the business by absorbing and integrating new business partners, new business sets, etc.

Current IT lifecycle processes are configured to managing self-contained and siloed solutions. However, as businesses transition to service oriented architectures (SOA), traditional IT governance methods are inadequate at managing SOA shared services during their entire lifecycle. SOA is not a self-contained and siloed solution; rather it's a decomposition of solutions into a set of shared services. It is these SOA shared services that require a new lifecycle management system, which takes into consideration multiple new processes that are not available or part of existing IT governance systems.

SUMMARY OF THE INVENTION

In one embodiment, there is a method for constructing a service oriented architecture (SOA) shared service. In this embodiment, the method comprises: receiving an input for a SOA shared service solution; and constructing a SOA shared service based on the design input for the SOA shared service solution.

In a second embodiment, there is a system for constructing a service oriented architecture (SOA) shared service. In this embodiment, the system comprises at least one processing unit, and memory operably associated with the at least one processing unit. A service construction tool is storable in memory and executable by the at least one processing unit. The service construction tool comprises: an input component configured to receive design input for a SOA shared service solution; and a construction component configured to construct a SOA shared service based on the design input for the SOA shared service solution.

In a third embodiment, there is a computer-readable medium storing computer instructions, which when executed, enables a computer system to construct a service oriented architecture (SOA) shared service, the computer instructions comprising: receiving an input for a SOA shared service solution; and constructing a SOA shared service based on the design input for the SOA shared service solution.

In a fourth embodiment, there is a method for deploying a service construction tool for use in a computer system that provides construction of a service oriented architecture (SOA) shared service. In this embodiment, a computer infrastructure is provided and is operable to: receive an input for a SOA shared service solution; and construct a SOA shared service based on the design input for the SOA shared service solution.

Figure 1:
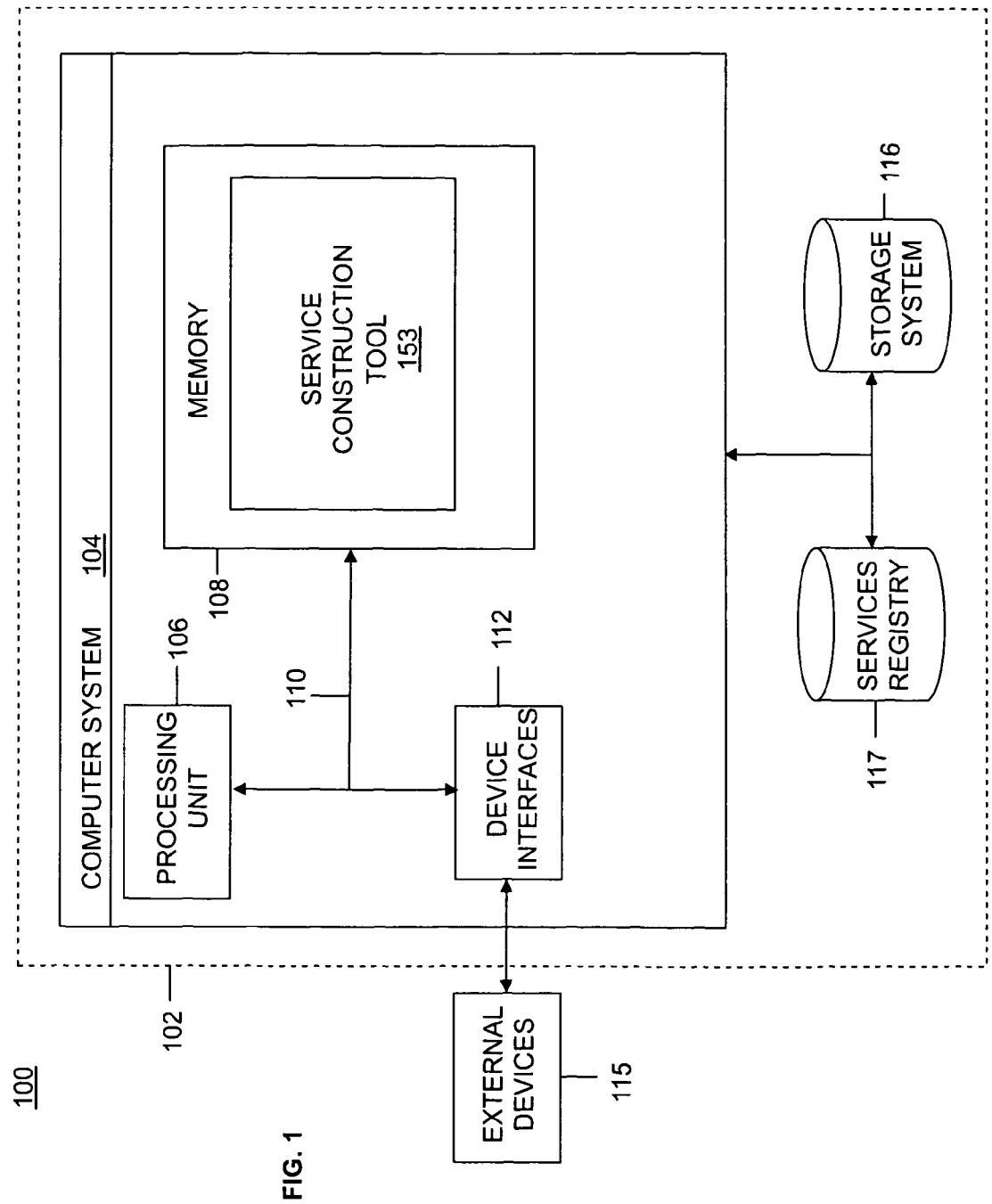
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to constructing a service oriented architecture (SOA) shared service. In these embodiments, a service construction tool provides this capability. Specifically, the service construction tool comprises an input component configured to receive design input for a SOA shared service solution; and a construction component configured to construct a SOA shared service based on the design input for the SOA shared service solution.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for constructing a SOA shared service. It should be understood that any other computers implemented under the present invention may have different components/software, but will perform similar functions. As shown, computer system 104 includes a processing unit 106, memory 108 for storing a service construction tool 153, a bus 110, and device interfaces 112.

Processing unit 106 collects and routes signals representing outputs from external devices 115 (e.g., a keyboard, a pointing device, a display, a graphical user interface, etc.) to service construction tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating service construction tool 153, which is stored in memory 108 and/or storage system 116. While executing computer program code, processing unit 106 can read and/or write data to/from memory 108, storage system 116, and a services registry 117. Services registry 117 stores a plurality of SOA shared services and associated metadata, as well as rules against which the metadata is compared to locate, update, and store SOA shared services. Storage system 116 and services registry 117 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Figure 2:
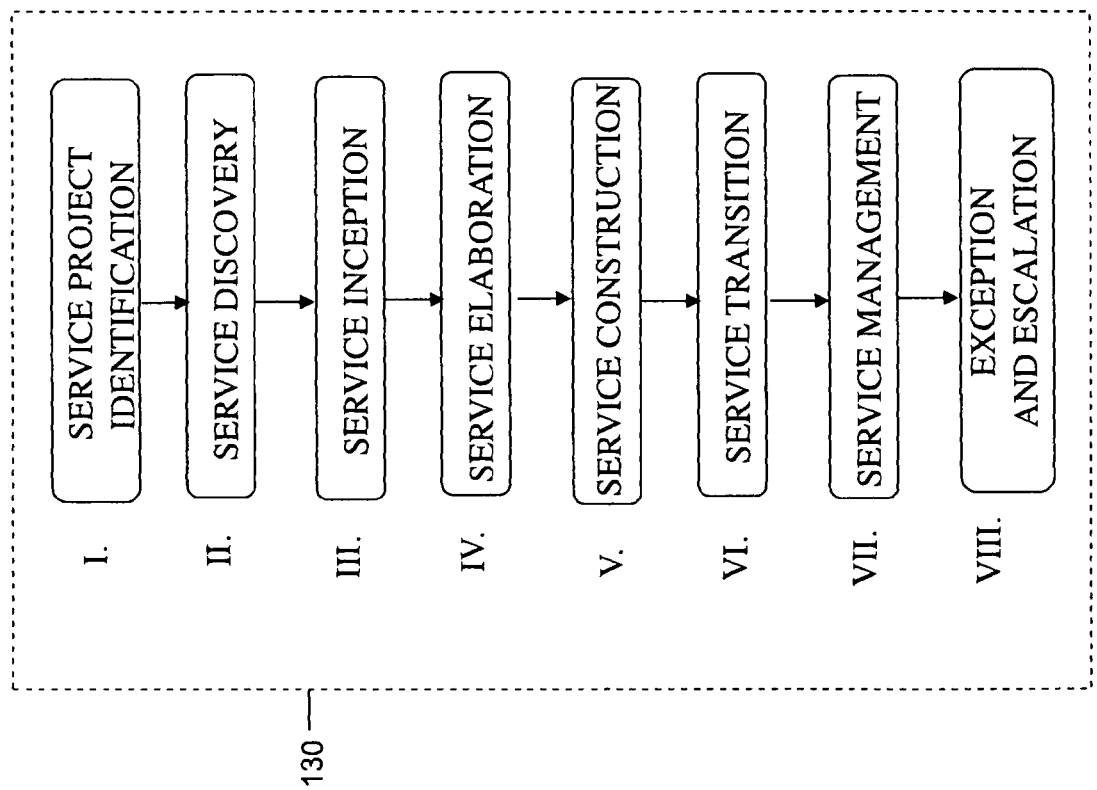
FIG. 2 shows a flow diagram of a SOA services lifecycle management process.

Implementation 100 and service construction tool 153 operate within a broader SOA services lifecycle management process (SLMP) 130, shown in FIG. 2, which identifies, evaluates, implements, constructs, and manages a SOA shared service. SOA SMLP 130 provides guidance for managing the entire lifecycle of a shared service(s) within an enterprise. Specifically, SOA SLMP 130 of the present invention includes new and distinct roles, governance checkpoints, increased collaboration requirements, and new decision control points. SOA SMLP 130 takes an extended view in identifying the various touch-points inside and outside of the organization to plan, build and manage shared services. The initial processes starts with the identification of a business initiative(s) (e.g., a business need) having the potential of being a shared service project candidate. The overall set of processes ends with the rollout of shared services fulfilling the identified business initiative, as well as management across its entire life.

SOA SLMP 130 of the present invention consists of the following distinct processes and associated methodologies:

I. New Service Project Identification—the goal of this phase is to evaluate and identify a SOA shared services opportunity (i.e., a business need), and to determine if the SOA shared services opportunity can be met through the use of SOA shared services.

II. Service Discovery—the goal of this phase is to complete the Discovery phase for a project that has been identified as a potential SOA services candidate project.

III. Service Inception—the goal of this phase is to gather the high level requirements for the SOA shared services that will be developed as part of the potential SOA services candidate project.

IV. Service Elaboration—the goal of this phase is to further define the high level requirements from the Inception phase into detailed requirements to complete the service solution design and prepare for the build phase.

V. Service Construction—the goal of this phase is to develop the integration components and integrate the SOA shared services components per the design guidelines while meeting/exceeding the necessary quality requirements so that the services can be deployed for general use.

VI. Service Transition—the goal of this phase is to transition the SOA shared services developed in the Construction phase to the operations group that will be responsible for ongoing SOA shared service maintenance.

VII. Service Management—the goal of this phase is to manage the SOA shared services once they have been transitioned to the operations team that will be responsible for ongoing SOA shared service maintenance.

VIII. Exception and Escalation—the goal of this phase is resolve issues that occur during the SOA services lifecycle process in an expedient manner.

Each of the above processes is a complete methodology that can be implemented independently since they define key stakeholders, affected processes, and touch-points throughout the organization. It will be appreciated that each of the above listed SOA processes are non-limiting examples of the functionality and operation of possible implementations of systems, methods and computer program products according to various embodiments of the present invention. In this regard, each process (I-VIII) may represent a module, segment, or portion of code, which comprises one or more executable instructions for implementing the specified logical function(s) of SOA SLMP 130, as shown in FIG. 2. It should also be noted that, in some alternative implementations, the functions noted in SOA SLMP 130 may occur out of the order listed above in processes I-VIII. For example, two processes shown in FIG. 2 in succession may, in fact, be executed substantially concurrently. It should also be noted that, in another alternative embodiment, additional or fewer process steps may be included in SOA SLMP 130. Further, each process of the flowchart of FIG. 2 can be implemented by special purpose hardware-based systems that perform the specified functions or acts, or combinations of special purpose hardware and computer instructions.

Figure 3:
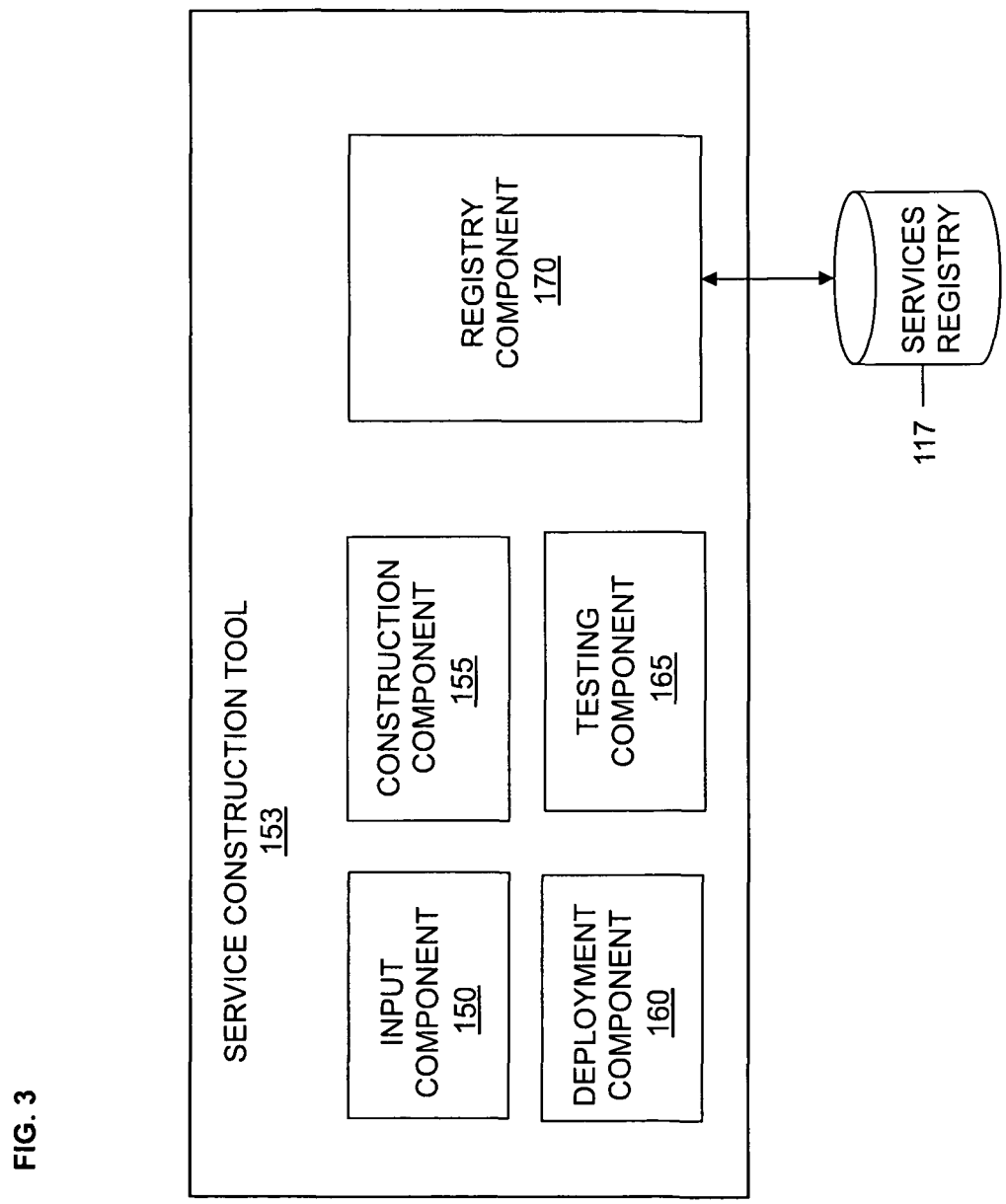
FIG. 3 shows a service construction tool that operates in the environment shown in FIG. 1.

FIG. 3 shows a more detailed view of service construction tool 153, which constructs a SOA shared service (e.g., a service that can be re-used/applied across multiple or different applications to address a business need) based on detailed requirements of the service solution design. As shown, service construction tool 153 comprises an input component 150 configured to receive design input for the SOA shared service. In one embodiment, input is received by an SOA enablement group for initiation of the service construction, wherein the input comprises virtually any information regarding the design and implementation of the SOA shared service necessary to initiate the service construction. The SOA enablement group evaluates the SOA shared service design and provides core integration support for the integration components of the SOA shared service. It will be appreciated that the SOA enablement group described herein may represent a committee or group of individuals within an organization, or may represent a module, segment, or portion of code, which comprises one or more executable instructions for implementing the transition of the SOA shared service(s).

Next, service construction tool 153 begins the process of building/constructing the SOA shared service. To accomplish this, service construction tool comprises a construction component 155 configured to construct a SOA shared service based on the design input for the SOA shared service solution received by input component 150. In one embodiment, construction component 155 is configured to build a set (i.e., one or more) of integration components, and test the set of integration components prior to deployment of the SOA shared service. Specifically, the integration components are first developed by creating a series of input/output messages, each message having defined endpoints (e.g., http, URI, MQ/JMS queues, etc.). Message format translation and protocol mediation is implemented, along with filter rules, log and audit function(s), and message enrichment logic. The integration components are tested, and then built by construction component 155. Further, construction component 155 is configured to create (i.e., design and build) an infrastructure to support deployment of the SOA shared service. Creating an infrastructure includes installing and setting the testing and deployment environment comprised of the hardware, software and the network systems. This includes setting up all configuration parameters required for the SOA shared services to become operational.

Following construction of the SOA shared service and the infrastructure to support the SOA shared service, the service it is deployed into production. To accomplish this, service construction tool 153 comprises a deployment component 160 configured to deploy the SOA shared service. In one embodiment, a project delivery team (e.g., a committee or group of individuals within an organization, or a module, segment, or portion of code, etc.) coordinates with project teams for build increment scheduling and the deployment of the integration components into the production environment. Following deployment, user feedback is obtained from an end user to evaluate an effectiveness of the SOA shared service. To accomplish this, service construction tool 153 comprises a testing component 165 configured to obtain feedback regarding the SOA shared service after it is deployed.

Figure 4:
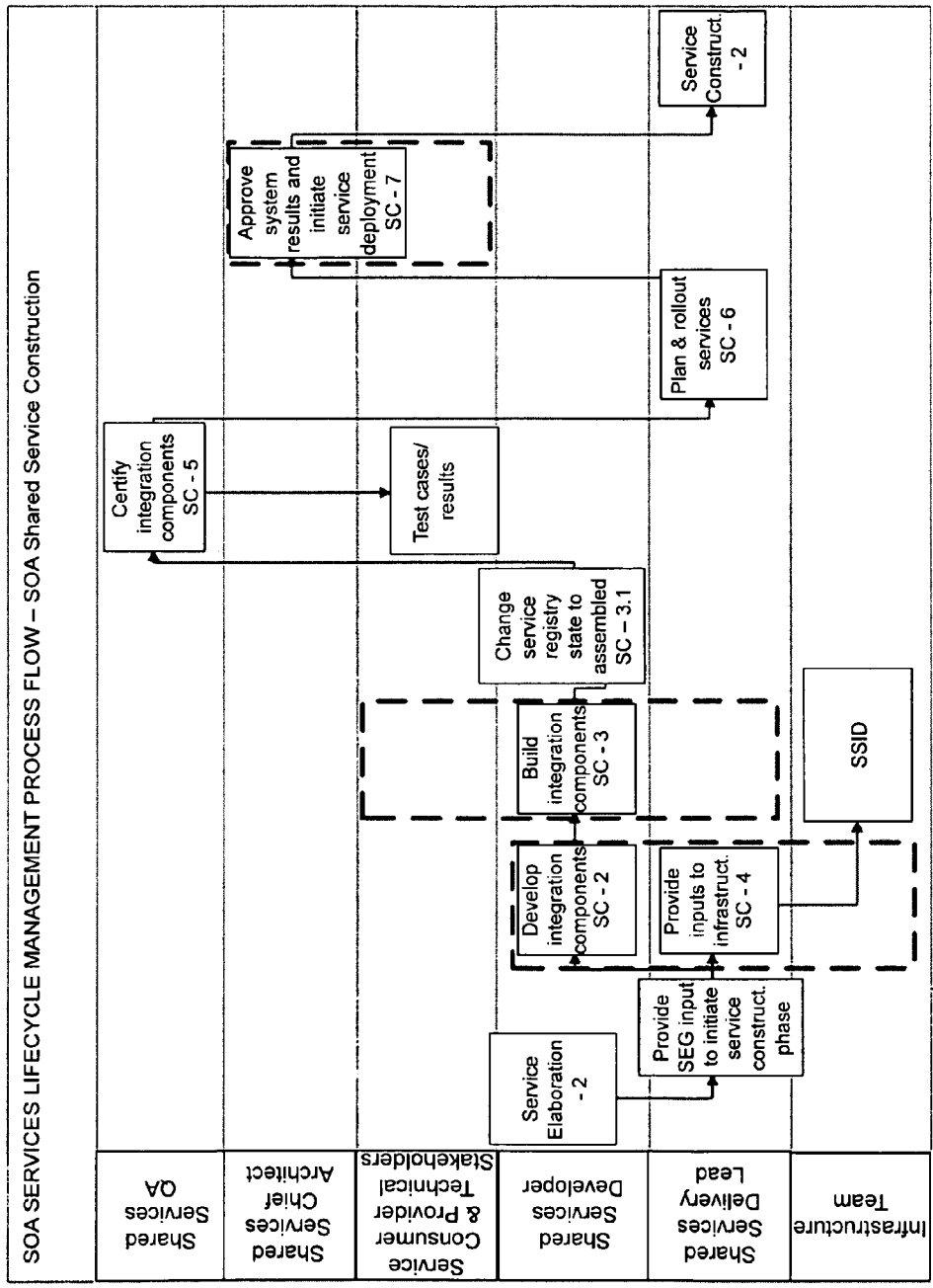
FIG. 4 shows a flow diagram of a SOA services lifecycle management process for constructing a SOA shared service.

Referring now to FIG. 4, a SOA services lifecycle management process (SLMP) flow 170 for constructing a SOA shared service will be described in further detail. As shown, SOA SLMP flow 170 begins by receiving design input for a SOA shared service solution, as established during the service elaboration phase (FIG. 2). At service construction-1 (SC-1), input is provided to the SOA enablement group to initiate the construction phase. Next, SOA SLMP flow 170 begins construction of the SOA shared service based on the design input for the SOA shared service solution. Specifically, at SC-2, integration components are developed, and subsequently built at SC-3. At SC-4, inputs from the SOA enablement group are received to an infrastructure for supporting deployment of the SOA shared service. The inputs may be any inputs to the infrastructure required to deploy the SOA shared service. At SC-3.1, services registry 117 (FIG. 1) is notified and updated with the SOA shared service. To accomplish this, service construction tool 153 further comprises a registry component 175 (FIG. 3) configured to update the status of the SOA shared service in services registry 117.

Next, at SC-5, the integration components are certified. In this step, complete unit and integration testing of the service integration is performed. Once testing is complete, the test cases/results are entered into services registry 117. At SC-6, the deployment of the certified SOA shared services into the production environment is planed and rolled-out (i.e., delivered). At SC-7, the system results are evaluated and deployment is initiated. In this step, the project delivery team completes the detailed design, construction and testing of SOA shared service components. This includes creation of service interface definitions (e.g. WSDL), message definitions (XML), message flows, message sets, etc.

Figure 5:
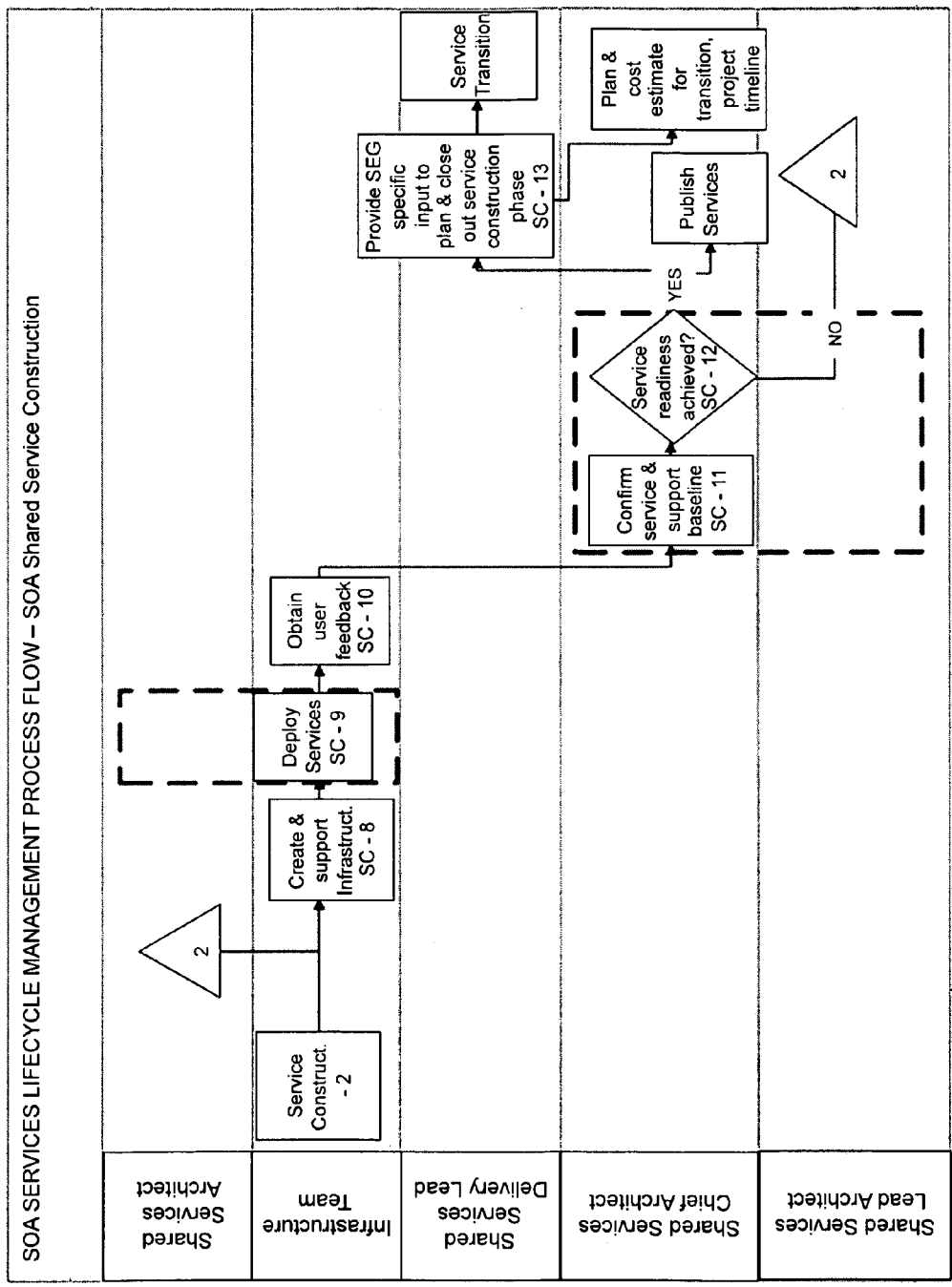
FIG. 5 shows a flow diagram of a SOA services lifecycle management process for constructing a SOA shared service.

Next, as shown in FIG. 5, SOA SLMP flow 170 continues at SC-8, where the infrastructure is created to support deployment of the SOA shared service. Once the infrastructure is in place, the SOA shared service is deployed at SC-9. In this step, the project delivery team coordinates with project teams for build increment scheduling and the deployment of components into an end-to-end development environment (i.e. the project delivery team deploys service components and any other components needed for the build increment). Next, at SC-10, feedback is obtained regarding the SOA shared service that has been deployed. At SC-11, SLMP flow 170 confirms achievement of service and support objectives by analyzing the end-user feedback and validating that service and support baselines have been achieved. Next, if service readiness is achieved at SC-12, the SOA enablement group proceeds to close out the service construction phase of SLMP 130 (FIG. 2) at SC-13. At this step, the SOA enablement group also provides review of the overall plan in terms of cost, transition time, project time, etc. However, if service readiness is not achieved, the process returns to start another iteration of deployment and testing.

As shown, FIGS. 4-5 detail the organizational roles and responsibilities for each entity in SOA SLMP flow 170. For example, SOA SLMP flow 170 identifies shared service roles indicating the primary and secondary (if applicable) roles for each entity (i.e., infrastructure team, shared services delivery lead, shared services developer, etc.) at each process of the service construction phase. For example, at SC-2, the shared services developer is considered to have primary responsibility for developing the integration components. All the other entities (e.g., the shared services delivery lead and the infrastructure team) are considered to have secondary responsibility. This may mean that the shared services developer is given main authority and accountability for developing the integration components at SC-2. In this regard, SOA SLMP flow 170 governs the rules of engagement between the various entities. SOA SLMP flow 170 provides integration points between the various entities across different organizational domains involved in the development, deployment, transition, and management of SOA shared services, as discussed herein.

It will be appreciated that SOA SLMP flow 170 represents possible implementations of a process flow for constructing SOA shared services, and that other process flows are possible within the scope of the invention. SOA SLMP flow 170 illustrates the architecture, functionality, and operation of possible implementations of systems, methods and computer program products according to various embodiments of the present invention. In this regard, each portion of the flowchart may represent a module, segment, or portion of code, which comprises one or more executable instructions for implementing the specified logical function(s). It will also be noted that each block of flowchart illustration can be implemented by special purpose hardware-based systems that perform the specified functions or acts, or combinations of special purpose hardware and computer instructions.

Further, it can be appreciated that the methodologies disclosed herein can be used within a computer system to provide construction of a SOA shared service, as shown in FIG. 1. In this case, service construction tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for constructing a SOA shared service. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for constructing a service oriented architecture (SOA) shared service comprising:
    evaluating design input information for planning, building, and managing a service oriented architecture (SOA) shared service based on an identified opportunity and an initiative for a SOA shared service solution at a SOA enablement group; and
    constructing a SOA shared service based on the design input information evaluated at the SOA enablement group for the SOA shared service solution, wherein the constructing comprises:
        building a set of SOA shared service integration components by:
            developing the set of SOA shared service integration components by creating a set of input/output messages each having defined endpoints, performing message format translation and protocol mediation, and applying a set of filter rules, log and audit functions, and message enrichment logic to each of the set of input/output messages; and
            constructing the set of SOA shared service integration components based on the development;
        constructing a service infrastructure, supported by the evaluation at the SOA enablement group, configured for both testing and deploying the SOA shared service by installing and establishing a combined testing and deployment environment including hardware, software, and network systems;
        assembling the SOA shared service, the SOA shared service comprising the set of SOA shared service integration components;
        updating a service registry with the SOA shared service and configuring the service registry to update a status of the SOA;
        testing a service integration of the set of SOA shared service integration components for a complete unit and a service integration prior to deployment of the SOA shared service using the infrastructure and entering a result of the testing into the service registry;
        deploying the SOA shared service based on the result of the testing; and
        adjusting the service infrastructure in the case that the infrastructure has not achieved service readiness.

2. The method according to claim 1, further comprising:
    deploying the SOA shared service into an end-to-end development environment based on a coordinated build increment schedule, the SOA shared service being deployed across a plurality of applications; and
    obtaining feedback regarding the SOA shared service after it is deployed.

3. The method according to claim 1, further comprising designing the infrastructure to support deployment of the SOA shared service.

4. The method according to claim 1 further comprising updating a status of the SOA shared service in a services registry.

5. The method according to claim 2, wherein the SOA shared service is deployed as part of a computer-implemented service construction phase of a SOA services lifecycle management process (SLMP), the SLMP comprising:
 evaluating and identifying, at a new service project identification phase, a SOA shared services opportunity, and determining if the SOA shared services opportunity can be met through the use of one or more SOA shared services;
 completing, at a service discovery phase, a discovery process for a project that has been identified as a potential SOA services candidate project;
 gathering, at a service inception phase, a set of high level requirements for the one or more SOA shared services that will be developed as part of the potential SOA services candidate project;
 further defining, at a service elaboration phase, the set of high level requirements from the service inception phase into detailed requirements to complete the service solution design and prepare for the service construction phase;
 developing, at the service construction phase, the integration components, and integrating the SOA shared services components per the design guidelines while satisfying a set of necessary quality requirements so that the SOA shared service is developed and deployed;
 transitioning, at a service transition phase, the SOA shared service developed in the service construction phase to an operations group that is responsible for ongoing SOA shared service maintenance;
 managing, at a service management phase, the SOA shared service once it have been transitioned to the operations group that is responsible for ongoing SOA shared service maintenance; and
 resolving, at an exception and escalation phase, issues that occur during the SOA services lifecycle process.

6. A system for constructing a service oriented architecture (SOA) shared service comprising:
 at least one processing unit;
 memory operably associated with the at least one processing unit; and
 a service construction tool storable in memory and executable by the at least one processing unit, the service construction tool comprising:
  an input component configured to evaluate design input information for planning, building, and managing a service oriented architecture (SOA) shared service based on an identified opportunity and an initiative for a SOA shared service solution at a SOA enablement group; and
  a construction component configured to construct a SOA shared service based on the design input information evaluated at the SOA enablement group for the SOA shared service solution, wherein the constructing comprises:
   building a set of SOA shared service integration components by:
    developing the set of SOA shared service integration components by creating a set of input/output messages each having defined endpoints, performing message format translation and protocol mediation, and applying a set of filter rules, log and audit functions, and message enrichment logic to each of the set of input/output messages; and
   constructing the set of SOA shared service integration components based on the development;
  constructing a service infrastructure, supported by the evaluation at the SOA enablement group, configured for both testing and deploying the SOA shared service by installing and establishing a combined testing and deployment environment including hardware, software, and network systems;
  assembling the SOA shared service, the SOA shared service comprising the set of SOA shared service integration components;
  updating a service registry with the SOA shared service and configuring the service registry to update a status of the SOA;
  testing a service integration of the set of SOA shared service integration components for a complete unit and a service integration prior to deployment of the SOA shared service using the infrastructure and entering a result of the testing into the service registry;
  deploying the SOA shared service based on the result of the testing; and
  adjusting the service infrastructure in the case that the infrastructure has not achieved service readiness.

7. The service construction tool according to claim 6 further comprising:
 a deployment component configured to deploy the SOA shared service into an end-to-end development environment based on a coordinated build increment schedule, the SOA shared service being deployed across a plurality of applications; and
 a testing component configured to obtain feedback regarding the SOA shared service after it is deployed.

8. The service construction tool according to claim 6, the construction component further configured to design the infrastructure to support deployment of the SOA shared service.

9. The service construction tool according to claim 6 further comprising a registry component configured to update a status of the SOA shared service in a services registry.

10. The service construction tool according to claim 7, wherein the SOA shared service is deployed as part of a computer-implemented service construction phase of a SOA services lifecycle management process (SLMP), the SLMP comprising:
 evaluating and identifying, at a new service project identification phase, a SOA shared services opportunity, and determining if the SOA shared services opportunity can be met through the use of one or more SOA shared services;
 completing, at a service discovery phase, a discovery process for a project that has been identified as a potential SOA services candidate project;
 gathering, at a service inception phase, a set of high level requirements for the one or more SOA shared services that will be developed as part of the potential SOA services candidate project;
 further defining, at a service elaboration phase, the set of high level requirements from the service inception phase into detailed requirements to complete the service solution design and prepare for the service construction phase;

developing, at the service construction phase, the integration components, and integrating the SOA shared services components per the design guidelines while satisfying a set of necessary quality requirements so that the SOA shared service is developed and deployed;

transitioning, at a service transition phase, the SOA shared service developed in the service construction phase to an operations group that is responsible for ongoing SOA shared service maintenance;

managing, at a service management phase, the SOA shared service once it have been transitioned to the operations group that is responsible for ongoing SOA shared service maintenance; and resolving, at an exception and escalation phase, issues that occur during the SOA services lifecycle process.

11. A computer-readable storage memory storing computer instructions, which when executed, enables a computer system to construct a service oriented architecture (SOA) shared service, the computer instructions comprising:

evaluating design input information for planning, building, and managing a service oriented architecture (SOA) shared service based on an identified opportunity and an initiative for a SOA shared service solution at a SOA enablement group; and constructing a SOA shared service based on the design input information evaluated at the SOA enablement group for the SOA shared service solution, wherein the constructing comprises:

building a set of SOA shared service integration components by:

developing the set of SOA shared service integration components by creating a set of input/output messages each having defined endpoints, performing message format translation and protocol mediation, and applying a set of filter rules, log and audit functions, and message enrichment logic to each of the set of input/output messages; and constructing the set of SOA shared service integration components based on the development;

constructing a service infrastructure, supported by the evaluation at the SOA enablement group, configured for both testing and deploying the SOA shared service by installing and establishing a combined testing and deployment environment including hardware, software, and network systems;

assembling the SOA shared service, the SOA shared service comprising the set of SOA shared service integration components;

updating a service registry with the SOA shared service and configuring the service registry to update a status of the SOA;

testing a service integration of the set of SOA shared service integration components for a complete unit and a service integration prior to deployment of the SOA shared service using the infrastructure and entering a result of the testing into the service registry;

deploying the SOA shared service based on the result of the testing; and adjusting the service infrastructure in the case that the infrastructure has not achieved service readiness.

12. The computer-readable storage memory according to claim 11, the computer instructions further comprising:

deploying the SOA shared service into an end-to-end development environment based on a coordinated build increment schedule, the SOA shared service being deployed across a plurality of applications; and obtaining feedback regarding the SOA shared service.

13. The computer-readable storage memory according to claim 11, the computer instructions for constructing further comprising designing the infrastructure to support deployment of the SOA shared service.

14. The computer readable storage memory according to claim 11, the computer instructions further comprising updating a status of the SOA shared service in a services registry.

15. The computer-readable storage memory according to claim 12, wherein the SOA shared service is deployed as part of a computer-implemented service construction phase of a SOA services lifecycle management process (SLMP), the SLMP comprising:

evaluating and identifying, at a new service project identification phase, a SOA shared services opportunity, and determining if the SOA shared services opportunity can be met through the use of one or more SOA shared services;

completing, at a service discovery phase, a discovery process for a project that has been identified as a potential SOA services candidate project;

gathering, at a service inception phase, a set of high level requirements for the one or more SOA shared services that will be developed as part of the potential SOA services candidate project;

further defining, at a service elaboration phase, the set of high level requirements from the service inception phase into detailed requirements to complete the service solution design and prepare for the service construction phase;

developing, at the service construction phase, the integration components, and integrating the SOA shared services components per the design guidelines while satisfying a set of necessary quality requirements so that the SOA shared service is developed and deployed;

transitioning, at a service transition phase, the SOA shared service developed in the service construction phase to an operations group that is responsible for ongoing SOA shared service maintenance;

managing, at a service management phase, the SOA shared service once it have been transitioned to the operations group that is responsible for ongoing SOA shared service maintenance; and resolving, at an exception and escalation phase, issues that occur during the SOA services lifecycle process.

16. A method for deploying a service construction tool for use in a computer system that provides construction of a service oriented architecture (SOA) shared service, comprising:

providing a computer infrastructure operable to:

evaluate design input information for planning, building, and managing a service oriented architecture (SOA) shared service based on an identified opportunity and an initiative for a SOA shared service solution at a SOA enablement group; and construct a SOA shared service based on the design input information evaluated at the SOA enablement group for the SOA shared service solution, wherein the constructing comprises:

building a set of SOA shared service integration components by:

developing the set of SOA shared service integration components by creating a set of input/output messages each having defined endpoints, performing message format translation and protocol mediation, and applying a set of filter rules, log and audit functions, and message enrichment logic to each of the set of input/output messages; and constructing the set of SOA shared service integration components based on the development;
constructing a service infrastructure, supported by the evaluation at the SOA enablement group, configured for both testing and deploying the SOA shared service by installing and establishing a combined testing and deployment environment including hardware, software, and network systems;
assembling the SOA shared service, the SOA shared service comprising the set of SOA shared service integration components;
updating a service registry with the SOA shared service and configuring the service registry to update a status of the SOA;
testing a service integration of the set of SOA shared service integration components for a complete unit and a service integration prior to deployment of the SOA shared service using the infrastructure and entering a result of the testing into the service registry;
deploying the SOA shared service based on the result of the testing; and
adjusting the service infrastructure in the case that the infrastructure has not achieved service readiness.

17. The method according to claim 16, the computer infrastructure further operable to:
deploy the SOA shared service into an end-to-end development environment based on a coordinated build increment schedule, the SOA shared service being deployed across a plurality of applications; and
obtain feedback regarding the SOA shared service after it is deployed.

18. The method according to claim 16, the computer infrastructure operable to construct further operable to design the infrastructure to support deployment of the SOA shared service.

19. The method according to claim 16, the computer infrastructure further operable to update a status of the SOA shared service in a services registry.

20. The method according to claim 17, wherein the SOA shared service is deployed as part of a computer-implemented service construction phase of a SOA services lifecycle management process (SLMP), the SLMP comprising:
evaluating and identifying, at a new service project identification phase, a SOA shared services opportunity, and determining if the SOA shared services opportunity can be met through the use of one or more SOA shared services;
completing, at a service discovery phase, a discovery process for a project that has been identified as a potential SOA services candidate project;
gathering, at a service inception phase, a set of high level requirements for the one or more SOA shared services that will be developed as part of the potential SOA services candidate project;
further defining, at a service elaboration phase, the set of high level requirements from the service inception phase into detailed requirements to complete the service solution design and prepare for the service construction phase;
developing, at the service construction phase, the integration components, and integrating the SOA shared services components per the design guidelines while satisfying a set of necessary quality requirements so that the SOA shared service is developed and deployed;
transitioning, at a service transition phase, the SOA shared service developed in the service construction phase to an operations group that is responsible for ongoing SOA shared service maintenance;
managing, at a service management phase, the SOA shared service once it have been transitioned to the operations group that is responsible for ongoing SOA shared service maintenance; and
resolving, at an exception and escalation phase, issues that occur during the SOA services lifecycle process.

\* \* \* \* \*